2,615,065

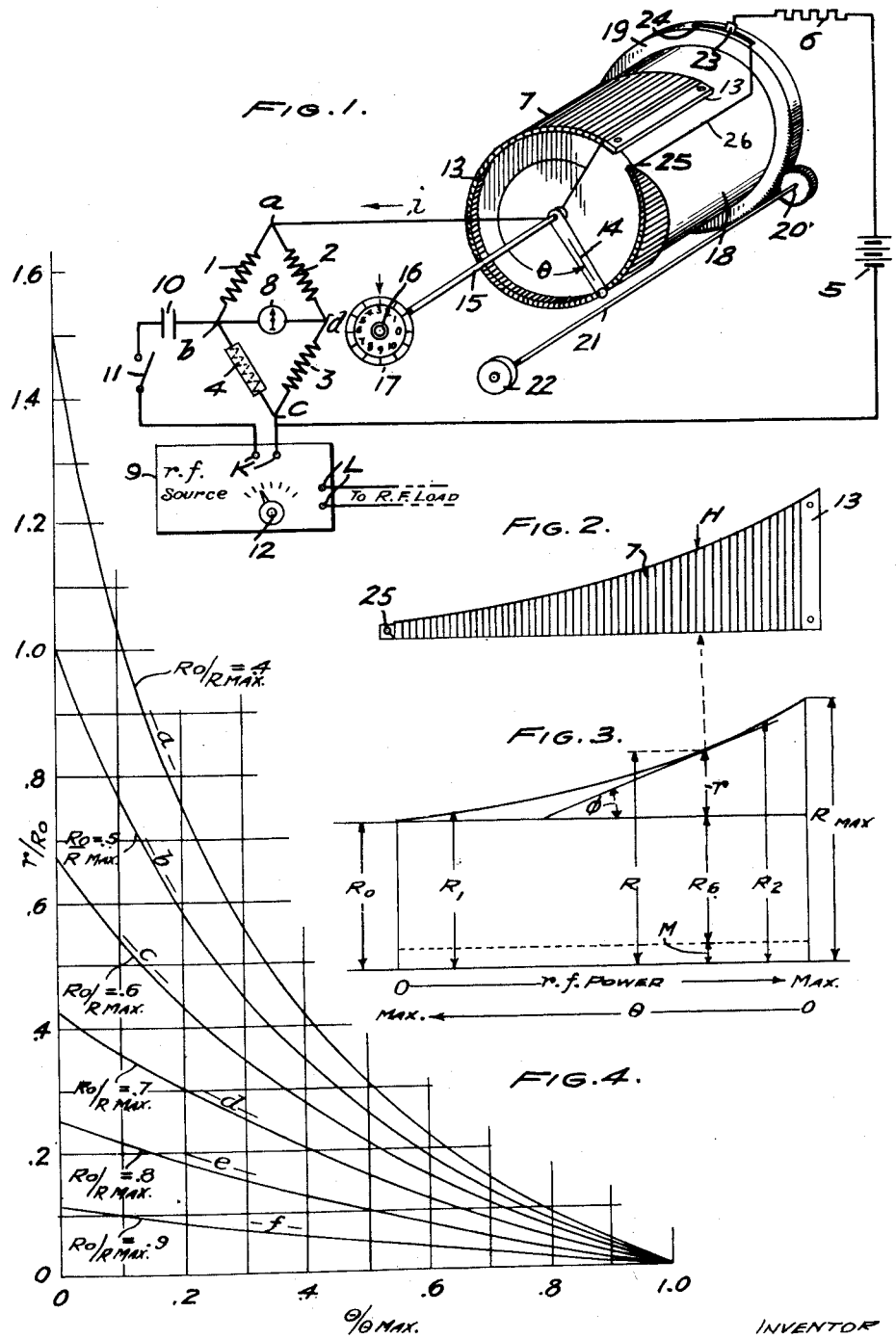
Oct. 21, 1952 — P. O. FARNHAM — 2,615,065
ELECTRICAL MEASURING SYSTEM
Filed Jan. 2, 1947
INVENTOR
Paul O. Farnham,
By Pierce, Scheffler & Parker,
ATTORNEYS Patented Oct. 21, 1952

UNITED STATES PATENT OFFICE 2,615,065

ELECTRICAL MEASURING SYSTEM

Paul O. Farnham, Mountain Lakes, N. J., assignor to Aircraft Radio Corporation, Boonton, N. J., a corporation of New Jersey Application January 2, 1947, Serial No. 719,760

3 Claims. (Cl. 171—95)

This invention relates to electrical measuring systems and in particular to an improved system for measuring electrical power.

The principal object of the invention is to provide an improved type measuring device employing a temperature-sensitive resistance element such as a thermistor by which the magnitude of the electrical power may be measured and read directly from the position of a control element of the bridge. Another object is to provide a bridge type measuring device in which electrical power may be read directly as a function of the resistance change of a rheostat required to rebalance the bridge after the electrical power to be measured is applied to the bridge. Another object is to provide a novel bridge type device by which electrical power may be set to a particular level. These and other objects and advantages will become more apparent from the following detailed description and from the accompanying drawings which illustrate a preferred construction.

In the drawings, Fig. 1 is a diagrammatic view showing how the improved bridge may be used to measure radio frequency power in accordance with this invention, and in which the temperature-sensitive resistor is of the type known as a thermistor; Fig. 2 is a development of the resistance element used in the rheostat associated with the bridge; Fig. 3 is a plot showing variation of the resistance of the bridge circuit for variations in the setting of the rheostat; and Fig. 4 is a family of curves showing how the resistance-control characteristic of the rheostat depends upon the range of total bridge circuit resistance.

The improved circuit shown in Fig. 1 for measuring power in the radio frequency range is comprised of a Wheatstone type of thermistor bridge which includes three resistor arms 1—3 whose resistance characteristics are substantially constant and a thermistor element 4 whose electrical resistance varies widely as its temperature is change, its resistance decreasing with increasing temperatures. A source of direct current such as battery 5, having a known and constant voltage, is connected through a fixed resistor 6 and non-linear rheostat 7 to the bridge diagonal terminals $a$ and $c$. The current in the line to the bridge is conveniently designated by the letter $i$. A part of $i$ flows through thermistor element 4, and thus by adjustment of rheostat 7, the direct current in the thermistor may be adjusted to an amount which will make the resistance of the thermistor correct for attaining a condition of bridge balance (no current in the galvanometer 8 connected across the bridge diagonal terminals $b$ and $d$). The extent of unbalance in the bridge will also be indicated by galvanometer 8.

The electrical power to be measured may be supplied to the thermistor 4 from a suitable radio frequency source 9, such as a radio frequency signal generator having measuring circuit terminals K across which the thermistor 4 is connected through a blocking condenser 10 and an on-off switch 11. As is customary in signal generators, the power output level at the useful output terminals L is adjustable over a range of from zero up to the maximum output level by a continuously variable attenuator, not shown, having a control knob 12, and the power absorbed in a measuring system connected across the terminals K bears a constant ratio to the power delivered to the output terminals L when the latter are terminated in a non-reflective load.

The non-linear rheostat 7 may be constructed of resistance wire wound with constant pitch on a card 13 of insulating material having a tapered configuration such as will produce the desired non-linear change in resistance as the winding is wiped over by contact arm 14. A typical resistor card is shown in development in Fig. 2. Arm 14 is mounted on a shaft 15 which carries an indicating dial 16, the dial being provided with a linear scale 17 graduated in suitable units of radio frequency power.

Card 13 carrying the rheostat winding 7 is fastened onto a short cylinder 18 that extends from a circular plate 19 which is suitably supported for rotation on its axis to permit a limited amount of angular adjustment of the resistance winding 7 relative to the contact arm 14. Such angular adjustment may be effected through a driver pinion 20 meshed with teeth at the rim of plate 19, the pinion 20 being turned manually by means of shaft 21 and knob 22 that is mounted adjacent the dial 16 for the convenience of the operator.

Connection between resistor 6 and the rheostat winding 7 may be made by means of a stationary brush 23 connected to one end terminal of resistor 6, the brush bearing against an arcuate conductive strip 24 set into the rim of plate 19 and connected via conductor 26 to the end terminal 25 of rheostat winding 7 which is at the narrow end of the card.

Prior to this invention, a thermistor type of bridge circuit generally in use for measuring radio frequency power was similar in many respects to the improved bridge circuit shown in Fig. 1, the principal difference, from a viewpoint of construction, being that an ordinary type of rheostat having a linear relation between resistance and displacement of the contact arm was used for adjusting the direct current bridge current to establish bridge balance; its mode of operation however was quite different. The prior bridge was operated by adjusting the rheostat to obtain bridge balance with no radio frequency power applied to the bridge. The radio frequency power was then applied to the bridge, causing the bridge to be unbalanced because of the change in thermistor resistance arising from the increase in thermistor temperature due to the additional radio frequency current component flowing through the thermistor branch of the bridge. The extent of the unbalance was indicated on the bridge galvanometer and, as the magnitude of the unbalance varied with the magnitude of the radio frequency power, it was the practice to calibrate the galvanometer scale to read in units of radio frequency power.

This prior type of thermistor bridge measuring system has three major disadvantages. In the first place, individual thermistors vary in their power sensitivity characteristic, i. e., the power required to change their resistance by a given percentage even at constant ambient temperature; secondly, a particular thermistor experiences changes in both its actual resistance and its power sensitivity for variations in ambient temperature and these effects require a temperature compensation of the direct current voltage supplied to the bridge and a temperature compensation of the galvanometer sensitivity; thirdly, since the bridge is operated off-balance while the radio frequency power is being measured, the impedance of the thermistor is in general not fixed and may therefore not satisfy properly the impedance matching requirements of the radio frequency part of the system.

To understand the construction and operation of the improved bridge circuit, in which a non-linear type of rheostat is used to control bridge current, and in which the power may be read directly from the setting of the rheostat arm, a brief analysis of the basic factors involved in the new bridge circuit will now be outlined.

Consider for the moment that the switch 11 is open and that the respective fixed resistance values of the bridge arms 1, 2 and 3 are alike. If the bridge is assumed to be brought to a balanced state by an adjustment of rheostat 7, then the resistance of the thermistor arm 4 must also be equal to that of the remaining three bridge arms. Under such conditions, the power P taken by the thermistor 4 from the voltage source 5 may then be expressed by the equation:

$$P = \frac{i_0^2 M}{4} \quad (1)$$

where $i_0$ is the current in the line from battery 5 to the bridge, and M is the resistance of one of the bridge arms (all bridge arms being of like resistance at such time).

If now the switch 11 be closed, thermistor 4 will be connected in the radio frequency circuit and hence a current proportional to the current taken by the radio frequency load across the output terminals L passes through thermistor 4. The result of this increase in current is to alter the temperature of the thermistor and hence change its resistance, which causes the bridge to become unbalanced. Consider that the bridge now be rebalanced by inserting additional resistance between the battery 5 and the bridge until the bridge current has been lowered to a value such that the resistance of thermistor 4 is again equal to that of the other three bridge arms.

Under the new condition of bridge balance, the current $i$ necessary for bridge balance with switch 11 open has now been decreased by the increment $\Delta i$, and the component of power taken by thermistor 4 attributable to the bridge current $i$ has been correspondingly decreased by a factor $\Delta P$. However, the total power taken by thermistor 4 with switch 11 closed and the bridge balanced remains the same as it was when this switch was open, since the resistance of thermistor 4 is still equal to that of the other bridge arms.

Hence the power $P_{R.F.}$ taken by thermistor 4 attributable to radio frequency circuit current component equals the factor $\Delta P$ and may be expressed by the equation:

$$P_{R.F.} = \Delta P = \frac{i_0^2 M}{4} - \frac{(i_0 - \Delta i)^2 M}{4} \quad (2)$$

If the total resistance to the flow of current $i$ at bridge balance be designated generally by R, and, with any individual thermistor element in use, the resistance at bridge balance with switch 11 open be designated $R_1$, the resistance at bridge balance with switch 11 closed designated $R_2$ and the fixed voltage at battery 5 designated $E_0$, then since $$i_0 = \frac{E_0}{R_1}, \text{ and } i_0 - \Delta i = \frac{E_0}{R_2}$$

the radio frequency power $P_{R.F.}$ can be expressed by the equation $$P_{R.F.} = \frac{E_0^2 M}{4}\left(\frac{1}{R_1^2} - \frac{1}{R_2^2}\right) \quad (3)$$

An inspection of Equation 3 shows that if the variable resistance factor R is given such a characteristic that $$\frac{1}{R^2}$$

varies linearly with the displacement of a rheostat arm or other similar resistance adjustor, it follows that one may calibrate the adjusting device for resistance R directly in terms of direct current power in thermistor 4 at bridge balance. Thus the radio frequency power in thermistor 4 may be read as the difference between two settings of the adjusting device for resistance R, whatever may be the value of R for the initial setting when switch 11 is open. The combined resistance R furnished by the fixed resistor 6 in series with the non-linear rheostat 7 and including the resistance M measured from terminals $a$ to $c$ of the bridge arms has this characteristic. That is, $$\frac{1}{R^2}$$

varies linearly with angular displacement of the rheostat arm 14.

Assuming a constant voltage from the direct current source 5, the total resistance R in the path of the direct current $i$ through the bridge as shown in Fig. 3 includes the bridge resistance M, the resistance $R_6$ of the fixed resistor 6, and the instant in-circuit resistance $r$ of the rheostat 7. For simplicity in computation, the sum of the fixed resistances, i. e. resistance $R_6$ and the bridge resistance M, at balance, will be designated $R_0$. Now assume that $$\frac{1}{R^2} = a\theta + b$$

where $a$ and $b$ are values to be determined by an analysis of the measuring circuit and $\theta$ is the angle through which arm 14 is rotated relative to the wide end of card 13, as shown in Fig. 1. Since $R=R_0+r$, it follows that $$\frac{1}{(R_0+r)^2}=\frac{1}{R^2}=a\theta+b \quad (4)$$

Solving for $r$, one obtains the equation $$r=\frac{1}{\sqrt{a\theta+b}}-R_0 \quad (5)$$

At $\theta=\theta$ max, $r=0$, and hence $$0=\frac{1}{\sqrt{a\theta \text{ max}+b}}-R_0 \quad (6)$$

At $\theta=0$, $r=r_{max}$, and hence $$r_{max}=\frac{1}{\sqrt{b}}-R_0 \quad (7)$$

From Equation 7

$$b=\frac{1}{(r_{max}+R_0)^2}=\frac{1}{R^2_{max}} \quad (8)$$

Putting this into Equation 6, one obtains $$0=\frac{1}{\sqrt{a\theta_{max}+\frac{1}{R^2_{max}}}}-R_0$$

or:

$$a=\frac{1}{\theta_{max}}\left(\frac{1}{R_0^2}-\frac{1}{R^2_{max}}\right) \quad (9)$$

Putting Equations 8 and 9 into Equation 5, one then arrives at the equation $$r=\frac{1}{\sqrt{\frac{\theta}{\theta_{max}}\left(\frac{1}{R_0^2}-\frac{1}{R^2_{max}}\right)+\frac{1}{R^2_{max}}}}-R_0 \quad (10)$$

also $$\frac{r}{R_0}=\frac{1}{\sqrt{\frac{\theta}{\theta_{max}}\left(1-\frac{R_0^2}{R^2_{max}}\right)+\frac{R_0^2}{R^2_{max}}}}-1 \quad (11)$$

For any particular application of the improved thermistor bridge to a radio frequency circuit, and taking into consideration the fact that as to thermistor elements now available, one element when connected in a bridge of the type shown may require a value of current higher than an average normal initially to balance the bridge before the radio frequency power is applied, while another thermistor element may require a value of current considerably lower than an average normal to attain bridge balance when the current through the thermistor proportional to the measured radio frequency load is at a maximum, one may without difficulty ascertain the value of resistance $R_0$ necessary initially to balance the bridge with switch 11 open and the value of resistance $R_{max}$, i. e. $(R_0+r_{max})$ necessary to effect bridge balance at the maximum of the radio frequency power to be measured with switch 11 closed. Knowing $R_0$ and $R_{max}$, and using Equation 11, one may tabulate and plot a curve such as curve "$a$" in Fig. 4, where the ratio of $R_0$ to $R_{max}$ equals .4, to show $$\frac{r}{R_0}$$

as a function of $$\frac{\theta}{\theta_{max}}$$

The resistance $r$ is then designed in accordance with this curve which is obviously non-linear as indicated in Fig. 3. The other curves $b$ to $f$ in Fig. 4 show the relationship between $r$ and $R_0$ for other ratios of $R_0$ to $R_{max}$ ranging from .5 to .9.

As previously explained, the non-linear resistance $r$ is constituted by the rheostat 7 and it will now be clear from the preceding paragraph that the particular non-linear characteristic of this resistor as regards displacement of the rheostat arm 14 is determined by the curve as plotted from Equation 11, a typical construction being shown in the development view in Fig. 2. The variable dimension H of the resistor card 13, assuming uniform wire, wound with constant lineal pitch and neglecting the thickness of the card, would be designed in accordance with the relation H=a constant multiplied by tan $\phi$, where $\phi$ in Fig. 3 is the slope of R at the same value of $\theta$ for which H is sought.

In accordance with this invention, the radio frequency power is read as the difference between two settings of the rheostat by which the bridge is balanced, first at zero radio frequency power and next with power applied to thermistor 4 from the measuring terminals K. To facilitate this difference reading, the first of the two readings can be made to occur at zero scale by use of the auxiliary adjustment effected by knob 22, and a description of such operation follows. To operate the bridge, switch 11 is first placed in its open position, dial 16 set to its zero power indication, and resistance 7 rotated relative to contact arm 14 by turning knob 22 to produce (with dial 16 still reading zero) the value $r$ of resistance 7 which brings the bridge to a balanced state as indicated by a zero reading on the bridge galvanometer 8. This initial adjustment by knob 22 will be necessary to accommodate expected ranges of individual thermistor characteristics and of ambient temperature by introducing such additional resistance as may be necessary to attain bridge balance. Switch 11 is then closed to connect thermistor 4 to the measuring terminals K of the radio frequency circuit and the bridge is thereby unbalanced. The dial 16 is then adjusted away from its present zero reading until the bridge is once again in balance and the level of the radio frequency power delivered at output terminals L of generator 9 can now be read directly from the dial scale 17.

The improved arrangement for operating the thermistor bridge is also useful for setting a radio frequency source, such as the illustrated signal generator 9, to a particular power level. This may be easily done by setting the dial scale 17 to the power level desired, after the bridge has been first balanced by adjusting knob 22 with no radio frequency power applied. The radio frequency power level applied via terminals K to the thermistor may now be adjusted upward from zero by control knob 12 of the signal generator until the galvanometer shows the bridge to be rebalanced.

Going back to Equations 1 and 2 it will be seen that any form of control element and control circuit for adjusting the bridge current $i$, which has a non-linear characteristic such that the square of the bridge current at bridge balance is linearly related to the displacement of the control actuator, may be used to carry out the invention, since it makes possible the use of a scale, associated with the adjustment, calibrated linearly in units of power.

In conclusion it should now be evident that the improved apparatus for measuring power on a thermistor bridge has none of the hereinbefore described disadvantages present in the prior art measuring devices. It may be stated that the outstanding feature of the present invention as distinguished from the prior art is the ability to measure electrical power directly on a linearly calibrated dial. This feature is obtained by a simple method of substitution measurement which is, on the one hand, free from the errors inherent in the more complicated compensation methods in the prior direct-reading systems with a bridge operating off-balance to accommodate a wide range in characteristics of a temperature-sensitive resistor; and on the other hand, is free from the adjustments and computations required in those prior indirect-reading systems which did make use of the accuracy available with a substitution type of measurement. By operating the bridge on a rebalancing basis rather than by relying upon the extent of the unbalance as indicated by the galvanometer to measure power, changes in ambient temperature have no effect upon the accuracy of the power measurement. The power to be measured is determined accurately by the difference between two values of direct current power, both of which are obtained under the condition that the resistance of the thermistor is fixed and known because the bridge is in balance for each power setting. From these same considerations it follows also that any variation in power sensitivity as between different thermistor elements will likewise have no effect on the accuracy of the results obtained.

Also it will be evident that while the variable element 7 which controls the bridge current $i$ has been illustrated as a wire-wound rheostat in series between the source of potential 5 and the bridge terminals $a$ and $c$, other arrangements by which the desired non-linear bridge current-displacement characteristic is attained, such as a potentiometer, may be used; and that, although the temperature-sensitive element 4 has been described as a thermistor with a negative temperature-resistance coefficient, other types of such temperature-sensitive elements may be employed. These and other changes in the arrangement and construction of parts may be made without departing from the spirit and scope of the invention as defined in the appended claims.

I claim:

1. Apparatus for measuring radio frequency power comprising a bridge including a temperature-sensitive resistor element as one arm thereof, means for introducing the radio frequency power in circuit with the temperature-sensitive resistor element; a direct current source of constant potential, a non-linear rheostat connected in the bridge circuit to control bridge current and including a tapered resistance element and a rotatable contact arm, said rheostat having a resistance-displacement characteristic such that $$\frac{1}{R^2}$$

varies linearly with angular displacement of the contact arm, wherein R is equal to the total series resistance across said direct current source which establishes through the bridge that value of direct current necessary to balance the bridge; and a radio frequency power indicating device; said device including a rotatable indicator member coupled to said contact arm for angular displacement therewith, and means supporting said rheostat for angular adjustment with respect to a fiducial mark associated with said indicator member, whereby said bridge may be balanced at zero electrical power input by angular adjustment of said rheostat with said indicator member set at said fiducial mark to indicate zero power input, and said contact arm may be adjusted angularly on said rheostat to rebalance the bridge when subject to a radio frequency power input, the position of the indicator member with respect to the fiducial mark then indicating the magnitude of the radio frequency power input to the temperature-sensitive resistor.

2. Apparatus for measuring radio frequency power comprising a bridge to be connected across a direct current source of constant potential and including a temperature-sensitive resistor element as one arm thereof; means for introducing the radio frequency power in circuit with the temperature-sensitive resistor element; a non-linear rheostat connected in the bridge circuit to control bridge current including a tapered resistance element and a rotatable contact arm, said rheostat having a resistance-displacement characteristic such that $$\frac{1}{R^2}$$

varies linearly with angular displacement of the contact arm, wherein R is equal to the resistance necessary to balance the bridge; and a radio frequency power indicating device comprising a graduated dial connected to said contact arm for angular displacement therewith, said dial having a linear scale of radio frequency power values of from zero upwards, a stationary fiducial mark adjacent said dial, and means for displacing said tapered resistance element angularly with respect to said contact arm, whereby the bridge may be balanced before the introduction of the radio frequency power by setting the zero power graduation of the dial to the fiducial mark and displacing the tapered resistance element to balance the bridge, thereby affording a direct reading of radio frequency power from said graduated dial when the bridge is rebalanced after introduction of the radio frequency power by adjustment of said contact arm with respect to said tapered resistance element.

3. Apparatus for measuring radio frequency power comprising a bridge including a temperature-sensitive resistor element as one arm thereof, a source of direct current of constant potential connected to a pair of opposite terminals of said bridge, means for introducing the radio frequency power in circuit with the temperature-sensitive resistor element, a galvanometer connected between the other pair of bridge terminals to indicate the balance condition of the bridge, resistance means including a non-linear rheostat connected in series with said current source and said bridge to adjust the direct current through the bridge to balance the bridge in the absence of and alternatively in the presence of an electrical power input to be measured, said rheostat including a rheostat arm movable with respect to a resistance element and having a resistance-displacement characteristic such that $$\frac{1}{R^2}$$

varies linearly with displacement of the rheostat arm, wherein R is equal to the sum of the bridge resistance at balance and of that value of said series resistance means which balances the bridge, a direct-reading radio frequency power indicator including cooperating elements carrying respectively a graduated scale and a fiducial mark, one element being stationary and the other being coupled with said rheostat arm for movement therewith, and means supporting said resistance element of said rheostat for adjustment with respect to a given position of the rheostat arm.

PAUL O. FARNHAM.

REFERENCES CITED

The following references are of record in the file of this patent:

UNITED STATES PATENTS

| Number | Name | Date |
| --- | --- | --- |
| 1,590,420 | Chubb | June 29, 1926 |
| 1,742,462 | Eisler | Jan. 7, 1930 |
| 2,114,330 | Borden | Apr. 19, 1938 |
| 2,407,075 | Gurewitsch | Sept. 3, 1946 |
| 2,417,820 | Ginzton | Mar. 25, 1947 |